R. YEILDING.
JOURNAL BEARING.

No. 40,220. Patented Oct. 6, 1863.

Witnesses:

Inventor:
Richard Yeilding

UNITED STATES PATENT OFFICE.

RICHARD YEILDING, OF YPSILANTI, MICHIGAN, ASSIGNOR TO HIMSELF AND HARRISON H. TOCK.

IMPROVEMENT IN JOURNAL-BEARINGS.

Specification forming part of Letters Patent No. 40,220, dated October 6, 1863.

*To all whom it may concern:*

Be it known that I, RICHARD YEILDING, of Ypsilanti, in the county of Washtenaw and State of Michigan, have invented a certain new and useful Improvement in Antifriction Journal-Bearings; and I do hereby declare the following to be a full and exact description of the same, reference being had to the accompanying drawings, making part of this specification, in which—

Figure 1:
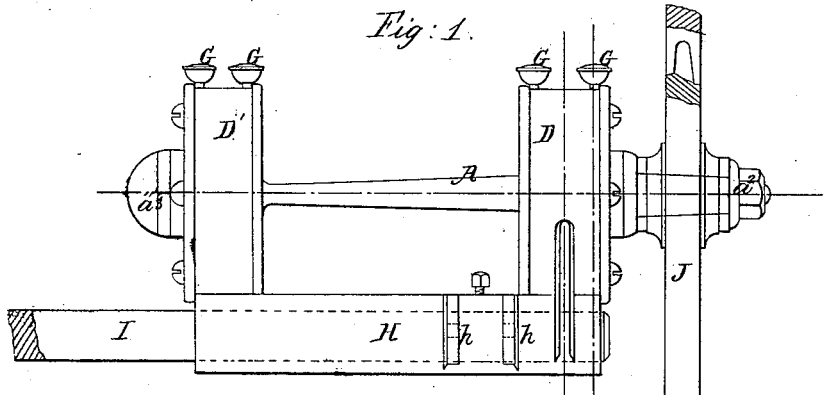
Figure 2:
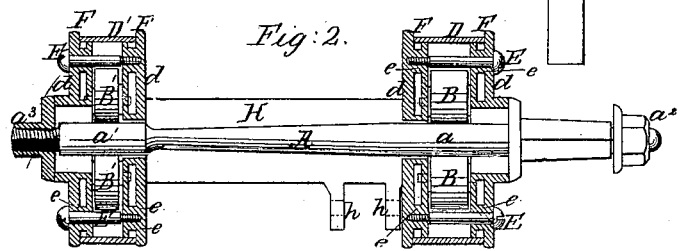
Figure 3:
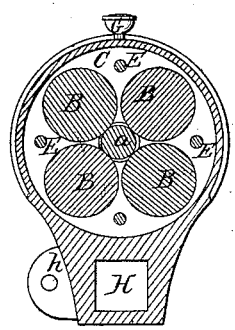
Figure 4:
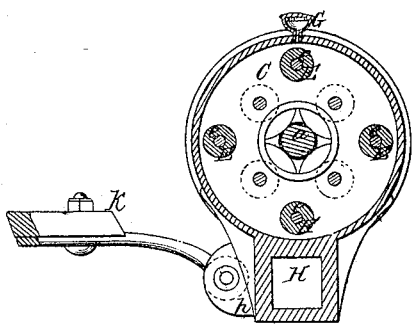

Figure 1 is a front elevation illustrating my journal-bearing applied to carriage-axles. Fig. 2 is a horizontal section of the same at $x$ $x$, Fig. 1. Fig. 3 is a transverse section thereof at $y$ $y$, Figs. 1 and 2. Fig. 4 is a transverse section thereof at $z$ $z$, Figs. 1 and 2.

Similar letters of reference indicate corresponding parts in the several figures.

My invention relates to that class of bearings in which the journals work upon the peripheries of wheels or rollers in such a manner as to reduce the friction.

The present improvements consist, first, in the use of boxes of novel construction to contain the friction-wheels, exclude dust, and afford means of attaching the bearings in any position and upon any part of the main axle of a carriage or upon any portion of a machine to which the invention may be applied; second, in the use of oil-reservoirs peculiarly constructed and applied to avoid waste of oil and afford constant lubrication to the journals of the antifriction-wheels.

In order that others skilled in the art to which my invention appertains may be enabled to fully understand and use the same, I will proceed to describe its construction and operation.

$a$ $a'$ may represent journals formed upon an axle, A, to which a wheel may be attached, as illustrated by red lines in Fig. 1. The said journals work upon the peripheries of wheels B B', which are themselves journaled in annular disks C C, fitting within boxes D D', and attached to the heads $d$ $d$ of the said boxes by hollow studs $e$ $e$, through which the bolts E E are passed to secure the heads of the boxes in position. The intervening spaces between the disks C and heads $d$ constitute oil-tight chambers F F, for containing oil by which the pivots or journals of the rollers B B' are lubricated constantly and without waste.

To prevent the escape of oil the pivots of the wheels B B' are made to tightly fit and close the apertures in the annular disks C, in which they run, and the ends of the said rollers are formed with collars immediately around their pivots, which work in contact with the faces of the disks, limiting any capillary action to the immediate vicinity of the pivots, and thus preventing any oil from being carried to the peripheries of the wheels.

G G may represent cups, cocks, or any other suitable appliance for introducing oil to the interior of the chambers F.

The above-described boxes D D' completely inclose the antifriction-wheels B B', with the exception of sufficient apertures to permit the insertion of the axle A, and may be mounted upon a hollow beam, H, which may be passed over the end of the main axle of a carriage in position to place the auxiliary axle A above, beneath, in front, or in rear of the main axle, as preferred.

$h$ $h$ represent lugs, to which the shafts or tongue of the carriage may be attached in customary manner.

The above description illustrates one mode of applying my invention to buggies or other carriages. I do not, however, desire to be understood as limiting myself thereto, nor to any specific manner of applying the invention. It may be applied to all descriptions of wheel-vehicles and the shafts of stationary machinery of various kinds.

I prefer to use four of the antifriction-wheels to each journal, but may use a less or greater number, as circumstances or preference dictate. The wheels mounted and arranged as above described afford cleanly bearings, avoiding wear and friction to the greatest possible extent, and the use of the oil-tight reservoirs F insures a constant lubrication of all parts exposed to friction, without waste of the lubricating material. I propose to use for lubricating purposes such oil, grease, or compound as may have the necessary properties and consistency according to the temperature, the speed of motion, and other circumstances It will be evident that by the manner described of fitting the pivots in apertures extending through the annular disks C C so that their ends will work in contact with the lubricating material I am enabled to use a material or compound which may assume a solid form when not in use, and, being melted by the warmth of the pivots, will work into their bearings with sufficient freedom to prevent injurious heating.

I may represent the main axle of the carriage, J. one of the wheels, and K a portion of the shafts. $a^2$ may represent the nut for confining the wheel on the auxiliary axle, and $a^3$ the nut for securing the auxiliary axle within the boxes D D'.

Having thus described my invention, what I claim as new therein, and desire to secure by Letters Patent, is—

1. The boxes D D', constructed and employed as described, to inclose and afford bearings in the inner walls of the oil-tight reservoirs for the antifriction-wheels B B', and provide means for attaching the auxiliary axles in any desired positions.

2. The oil-tight reservoirs F F, employed in the manner described, within the boxes D D', to afford constant lubrication to the pivots.

RICHARD YEILDING.

Witnesses:
CHARLES SMITH,
OCTAVIUS KNIGHT.